United States Patent
Srivastava et al.

(10) Patent No.: US 10,939,449 B2
(45) Date of Patent: Mar. 2, 2021

(54) RADIO RESOURCE ALLOCATION FOR EMERGENCY VEHICULAR COMMUNICATIONS

(71) Applicant: Cisco Technology, Inc., San Jose, CA (US)

(72) Inventors: Vimal Srivastava, Karnataka (IN); Pradeep Kumar Kathail, Los Altos, CA (US); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 16/118,622

(22) Filed: Aug. 31, 2018

(65) Prior Publication Data

US 2020/0077407 A1  Mar. 5, 2020

(51) Int. Cl.
*H04W 72/04* (2009.01)
*H04W 4/90* (2018.01)
*H04W 4/40* (2018.01)
*H04W 4/06* (2009.01)
*H04W 60/04* (2009.01)

(52) U.S. Cl.
CPC ......... *H04W 72/0493* (2013.01); *H04W 4/06* (2013.01); *H04W 4/40* (2018.02); *H04W 4/90* (2018.02); *H04W 60/04* (2013.01); *H04W 72/0413* (2013.01)

(58) Field of Classification Search
CPC ... H04W 72/0493; H04W 4/90; H04W 60/04; H04W 4/06; H04W 72/0413; H04W 4/40; H04W 72/10; H04W 60/00
See application file for complete search history.

(56) References Cited

U.S. PATENT DOCUMENTS

| | | | |
|---|---|---|---|
| 5,862,485 A | 1/1999 | Linneweh, Jr. et al. | |
| 9,723,457 B2 | 8/2017 | Brahmi et al. | |
| 9,961,685 B2 | 5/2018 | Sorrentino et al. | |
| 2016/0234825 A1* | 8/2016 | Axmon | H04W 8/24 |
| 2016/0295624 A1 | 10/2016 | Novlan et al. | |
| 2017/0188391 A1* | 6/2017 | Rajagopal | H04W 74/0816 |
| 2017/0201461 A1 | 7/2017 | Cheng et al. | |
| 2017/0290028 A1* | 10/2017 | Lee | H04W 72/14 |
| 2018/0049274 A1* | 2/2018 | Kim | H04W 84/18 |
| 2018/0270666 A1* | 9/2018 | Lee | H04W 12/08 |
| 2020/0077327 A1* | 3/2020 | Duan | H04W 74/0833 |

* cited by examiner

*Primary Examiner* — Charles C Jiang
*Assistant Examiner* — Thad N Defauw
(74) *Attorney, Agent, or Firm* — Patterson + Sheridan, LLP

(57) ABSTRACT

In one embodiment, a method is performed. A device may receive a registration request from a user equipment (UE) device associated with a category. The device may receive a registration response from an access and mobility function (AMF). The registration response may comprise a group identifier associated with the category. The device may select resources from a resource pool based on the group identifier. The resource pool may be dedicated for use for emergency communications. The device may allocate the selected resources to the UE device.

15 Claims, 6 Drawing Sheets

RADIO RESOURCE ALLOCATION FOR EMERGENCY VEHICULAR COMMUNICATIONS

TECHNICAL FIELD

The present disclosure generally relates to communications between vehicles.

BACKGROUND

Vehicles in a fleet may communicate with one another and with roadside infrastructure elements. For example, vehicles may exchange traffic safety alerts or may receive safety alerts from roadside infrastructure elements. Vehicles may receive safety messages from other vehicles and/or from roadside infrastructure elements. A long term evolution (LTE) architecture may be used to facilitate such communications.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
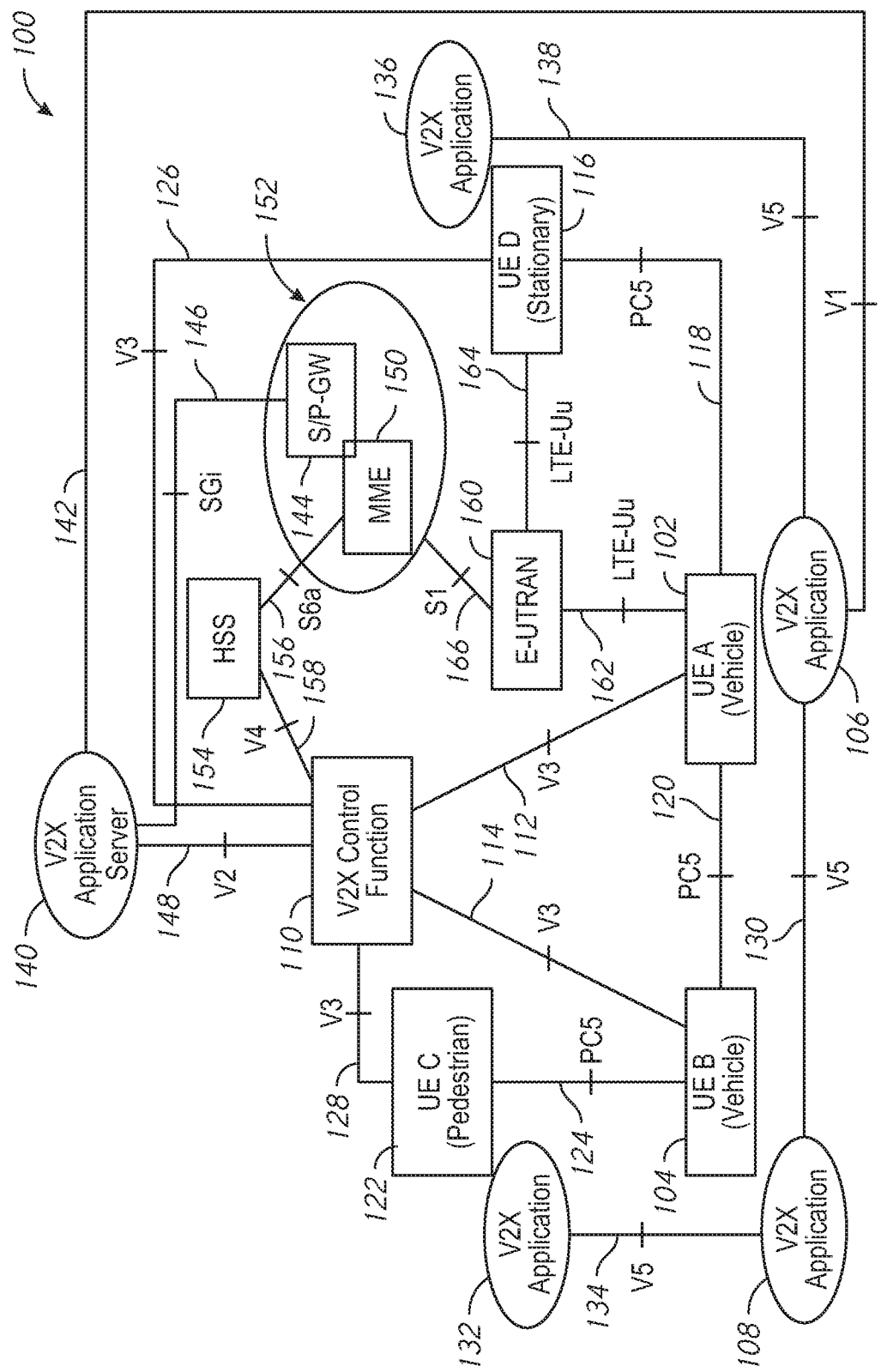
FIG. 1 is a block diagram that illustrates an example network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for allocating resources to UE devices that may be used in emergency vehicles and/or in roadside units (RSU) to facilitate communications among the emergency vehicles (e.g., vehicle to vehicle (V2V) communication) and/or between an emergency vehicle and an RSU (e.g., vehicle to infrastructure (V2I) communication). The allocated resources may be selected from a pool of resources that are dedicated for use for emergency communications, such that the resources may not be allocated to other, non-emergency UE devices.

In an embodiment, a method may be performed. A device may receive a registration request from a user equipment (UE) device associated with a category. The device may receive a registration response from an access and mobility function (AMF). The registration response may comprise a group identifier associated with the category. The device may select resources from a resource pool based on the group identifier. The resource pool may be dedicated for use for emergency communications. The device may allocate the selected resources to the UE device.

In an embodiment, a device may include a network interface in communication with a network. A processor may be configured to execute computer readable instructions included on a non-transitory memory. A non-transitory memory may include processor-readable instructions, that when executed by the processor, cause the device to receive a registration request from a user equipment (UE) device associated with a category. The device may receive a subscription profile from a unified data management (UDM) module. The subscription profile may comprise a group identifier associated with the category. The device may send the group identifier to an eNodeB device. The group identifier may be associated with a resource pool dedicated for use for emergency communications.

Example Embodiments

FIG. 1 illustrates an example network 100 that may be used to facilitate vehicular communication. One or more vehicles may have user equipment (UE) devices 102, 104 installed and may be provisioned with vehicle-to-everything (V2X) applications 106, 108, respectively. The UE devices 102, 104 may communicate with a V2X control function module 110 using V3 interfaces 112, 114, respectively.

The UE device 102 may communicate with a UE device 116, which may be a stationary UE device. The UE device 102 may communicate with the UE device 104. Both communications with other UE devices may be conducted over respective PC5 interfaces 118, 120. The UE device 104 may communicate with a UE device 122, which may be held by a pedestrian, using a PC5 interface 124. The UE devices 116, 122 may communicate with the V2X control function module 110 using V3 interfaces 126, 128, respectively.

Vehicular applications may also communicate with entities in the network 100. For example, V2X applications 106, 108 may communicate with each other using a V5 interface 130. The V2X application 108 may communicate with a V2X application 132 installed on the UE device 122 using a V5 interface 134. The V2X application 106 may communicate with a V2X application 136 installed on the UE device 122 using a V5 interface 138.

The V2X application 106 may communicate with a V2X application server 140 using a V1 interface 142. The V2X application server 140 may communicate with a gateway entity 144 using an SGi interface 146. The V2X application server 140 may communicate with the V2X control function module 110 using a V2 interface 148.

The gateway entity 144 may be implemented, for example, as a serving gateway (S-GW) and/or a packet data network (PDN) gateway (P-GW). The gateway entity 144 may be integrated with a mobility management entity (MME) 150 in a device 152, as shown in FIG. 1. The gateway entity 144 and the MME 150 may reside in distinct devices.

A home subscriber server (HSS) 154 may communicate with the MME using an S6a interface 156. The HSS 154 may communicate with the V2X control function module 110 using a V4 interface 158.

An evolved universal mobile telecommunications system (UMTS) terrestrial radio access network (E-UTRAN) entity 160 may communicate with UE devices. For example, the E-UTRAN entity 160 may communicate with the UE devices 102, 116 using LTE-Uu interfaces 162, 164, respectively. The E-UTRAN entity 160 may communicate with the MME 150 using an S1 interface 166.

Vehicles in a fleet may communicate among themselves and with roadside infrastructure elements to exchange traffic safety alerts and safety messages. Such vehicular communications may be latency-sensitive. For emergency services, an assured quality of service (QoS) level may be beneficial. Emergency services may benefit from the capability to preempt other communications, such as nonemergency communications.

In some embodiments, a set of shared resource blocks (RBs) may be allocated for a group of vehicles and/or infrastructure elements. An allocation of shared resource blocks may be based at least in part on a group affiliation, such as a geographic location. For example, a resource block, e.g., resource block 1, may be assigned to a group of vehicles comprising all of the first responder units in Milpitas, Calif. A resource block may be assigned to a group of vehicles comprising the fire crew of a defined zone, e.g., "zone 1." The determination of a group affiliation may be based on a unified data management (UDM) profile. The determination of a group affiliation may be based on a service authorization.

Some countries may have dedicated bands for emergency communications, e.g., the 4.9 GHz public safety spectrum in the United States. Resources may be carved out for emergency vehicles in the V2X infrastructure that may be deployed in a given area. In some areas, a V2X infrastructure may be the only available infrastructure. In some areas, a V2X infrastructure may augment other dedicated bands.

In some embodiments, a network using a V2X architecture may allocate one or more channels for the exclusive use of one or more types of vehicles, such as emergency vehicles.

Figure 2:
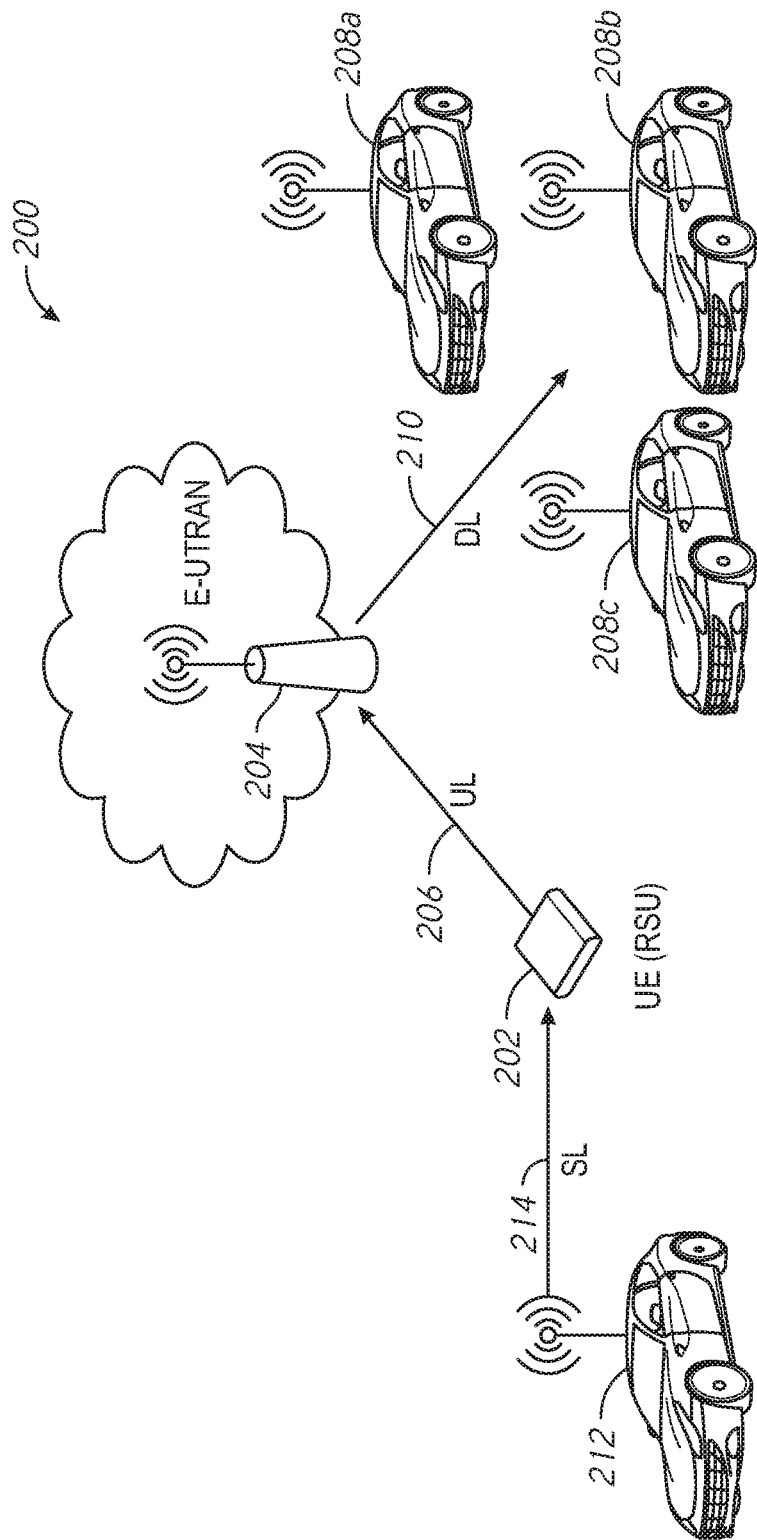
FIG. 2 is a diagram that illustrates an example network according to some embodiments.

FIG. 2 illustrates an example network 200 in accordance with some embodiments. A roadside unit (RSU) 202 may communicate with an E-UTRAN entity 204 using an uplink channel 206. The E-UTRAN entity 204 may communicate with one or more vehicles 208a, 208b, 208c in a fleet using a downlink channel 210. The RSU 202 may communicate with a vehicle 212 using a sidelink channel 214.

Entities in a V2X network may communicate with each other using network-based communication. Network-based communication may use a LTE network. Such communications may be conducted using a LTE-Uu interface for uplink communications. A UE device, such as the RSU 202, may transmit a message over a LTE-Uu interface, e.g., to the E-UTRAN entity 204. Downlink messages may be unicast to a device, e.g., from the E-UTRAN entity 204 to one of the vehicles 208a, 208b, 208c. Downlink messages may be transmitted using an evolved packet core (EPC) multimedia broadcast multicast services (MBMS) system, for example, to multiple vehicles 208a, 208b, 208c.

Entities in a V2X network may communicate directly with one another, e.g., without routing a message to a LTE network. For example, as shown in FIG. 2, the RSU 202 may communicate with the vehicle 212 directly without using the E-UTRAN entity 204. Such communications may occur using a PC5 interface, which may be known as a sidelink. Direct communication may support resource allocation schemes for the transmission of control and data information. Direct communication may support scheduled resource allocation and/or autonomous resource allocation, for example.

In scheduled resource allocation, a network node, such as an eNodeB (eNB) device, may authorize a resource pool for transmissions on the PC5 interface. The network node may provide a transmitting UE device with physical sidelink control channel (PSCCH) resources in which to transmit sidelink control information (SCI). The network node may provide physical sidelink shared channel (PSSCH) resources to transmit data.

In autonomous resource allocation, a UE device may autonomously select channel resources within a control pool for transmission of SCI. The UE device may autonomously select resources within the transmission pool for messages carrying user plane data. These resource pools may be statically allocated. A resource pool may be a set of resources that may be assigned to the UE device for communication on the PC5 interface. A resource pool may include one or more subframes and resource blocks within the one or more subframes.

In some embodiments, vehicles, such as emergency vehicles, may be grouped into categories. One or more dedicated resource pools may be allocated to the categories. Vehicles to which a dedicated resource pool is allocated may communicate with other vehicles of the same category or with infrastructure (V2I) nodes using the PC5 interface without requesting a resource block allocation from the eNB. Because the resource pool is dedicated for the use of a category of vehicles, the resource pool may not be allocated to any other UE device at the location. Accordingly, availability of the dedicated resource pool may be ensured.

Vehicles of the same category, e.g., emergency vehicles, in a given locality may remain connected using the PC5 interface by using dedicated resource pools. Such vehicles may communicate with V2I nodes, such as roadside units (RSUs) using the PC5 interface using dedicated resource pools. The RSUs may broadcast emergency messages to other emergency vehicles as well as to an application server in a core network, for example, for further handling or propagation.

Figure 3:
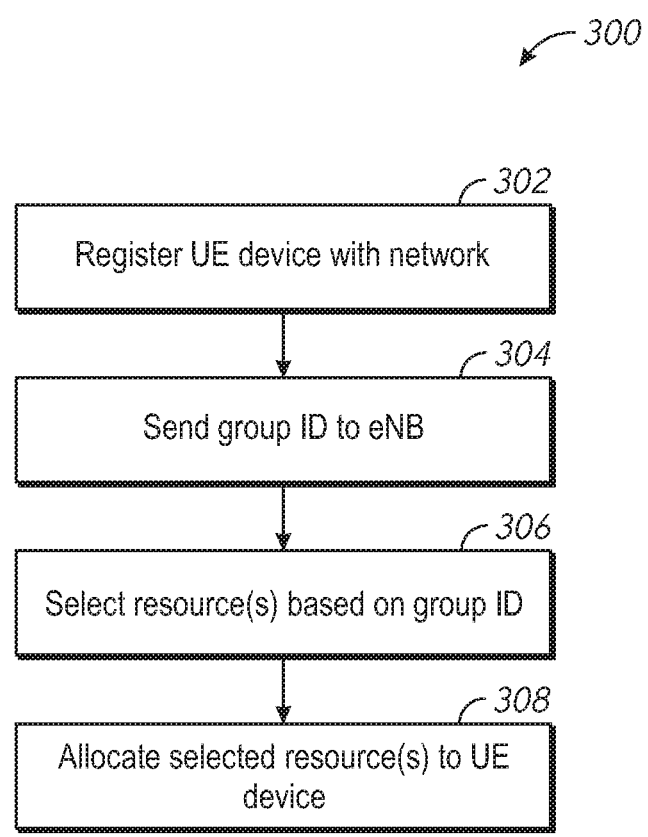
FIG. 3 is a flow diagram that illustrates an example method that may be performed by the network of FIG. 2.

FIG. 3 is a flow diagram illustrating an example method 300 that may be performed by the network 200. At 302, a UE device, e.g., UE device 208a, may register with the network 200. The UE device may have a type, such as emergency vehicle, police vehicle, ambulance, and the like. The type of the UE device may be associated with a group identifier. The UE device may communicate this group identifier with the network when it registers with the network 200.

At 304, the network 200 may communicate the network identifier with an eNB device. At 306, the eNB device may select resources from a dedicated resource pool based on the group identifier. The eNB device may allocate the selected resources to the UE device at 308.

Figure 4:
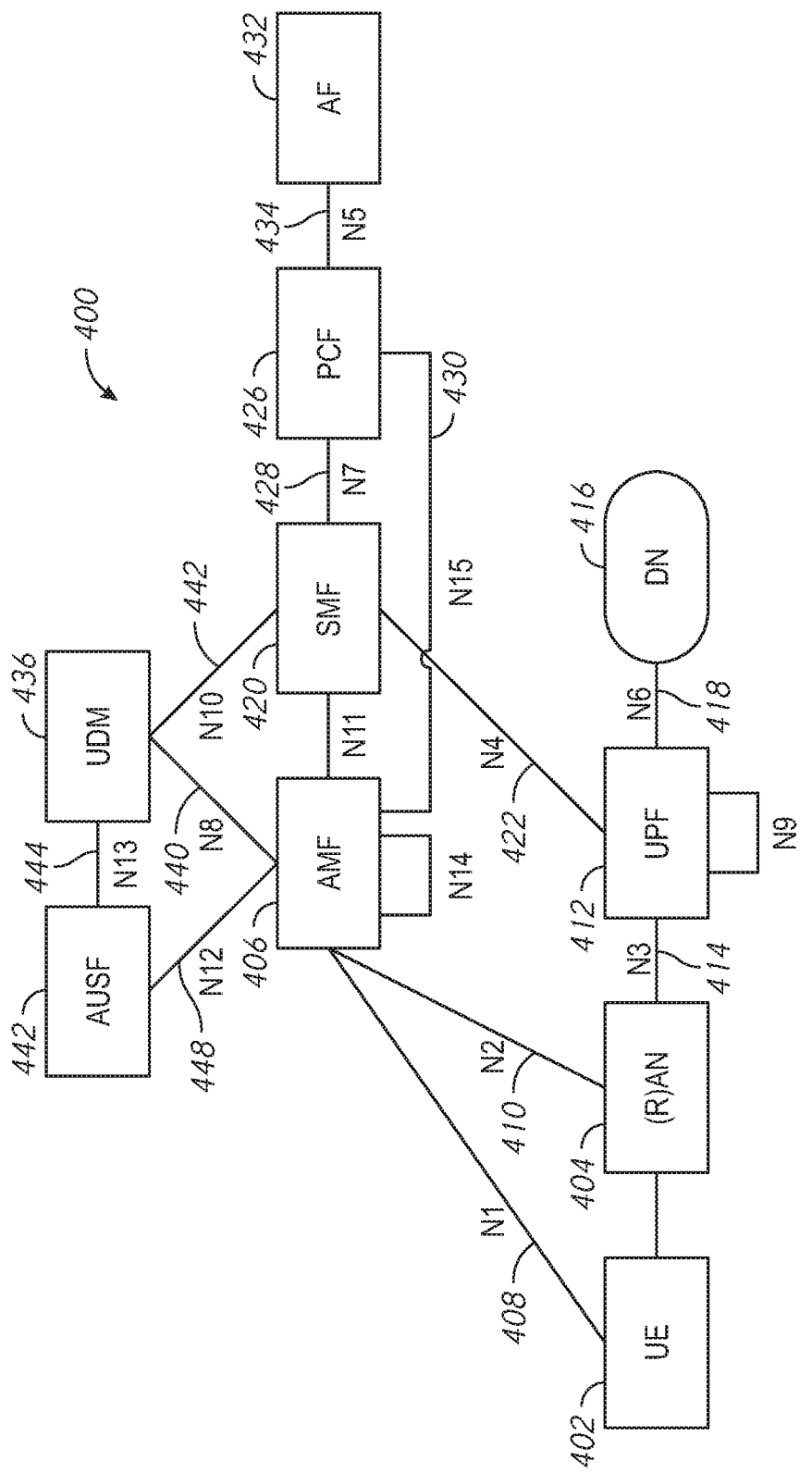
FIG. 4 is a diagram that illustrates an example network architecture according to some embodiments.

FIG. 4 illustrates an example network architecture 400 that may be used to facilitate vehicular communication. A UE device 402 may communicate with a radio access network (RAN) 404. The UE device 402 and the RAN 404 may communicate with an access and mobility management function (AMF) module 406 using an N1 interface 408 and an N2 interface 410, respectively. The AMF module 406 may provide mobility management, access authentication and/or authorization, and/or a security anchor function. The AMF module 406 may provide security context management. The AMF module 406 may provide a transparent proxy for routing access authentication messages. The AMF module 406 may provide an interface for lawful intercept functions.

The RAN 404 may communicate with a user plane function (UPF) module 412 using an N3 interface 414. The UPF module 412 may be responsible for packet routing and forwarding, packet inspection and policy rule enforcement, and traffic accounting and reporting. The UPF module 412 may perform QoS handling for the user plane. The UPF module 412 may provide an interface for lawful intercept functions for the user plane. The UPF module 412 may provide an anchor point for intra-RAT or inter-RAT mobility, e.g., when applicable. The UPF module 412 may support interaction with an external data network (DN) for transport of signaling for PDU session authentication and/or authorization by an external data network. The UPF module 412 may communicate with a data network (DN) 416 using an N6 interface 418.

The UPF module 412 may communicate with a session management function (SMF) module 420 using an N4 interface 422. The SMF module 420 may support UE IP address allocation and management, which may include authorization. The SMF module 420 may support lawful intercept functions. The SMF module 420 may support selection and control of user plane functions. The SMF module 420 may support termination of interfaces toward policy control and charging functions. The SMF module 420 may support other functions related to session management. The SMF module 420 may communicate with the AMF module 406 using an N11 interface 424.

A policy control function (PCF) module 426 may provide a unified policy framework to govern network behavior. The PCF module 426 may provide policy rules to control plane functions that may enforce the policy rules. The PCF module 426 may communicate with the SMF module 420 using an N7 interface 428. The PCF module 426 may communicate with the AMF module 406 using an N15 interface 430. The PCF module 426 may communicate with an application function (AF) module 432 using an N5 interface 434. The AF module 432 may request dynamic policies and/or charging control.

A unified data management (UDM) module 436 may support an authentication credential repository and processing function. This function may store long-term security credentials that may be used in authentication. The UDM module 436 may store subscription information. For example, the UDM module 436 may store subscription information relating to UE devices installed in emergency vehicles. This subscription information may include the type of emergency vehicle a particular UE device is installed in. The UDM module 436 may communicate with the AMF module 406 using an N8 interface 438. The UDM module 436 may communicate with the SMF module 420 using an N10 interface 440. The UDM module 436 may communicate with an authentication server function (AUSF) module 442 using an N13 interface 444.

Figure 5:
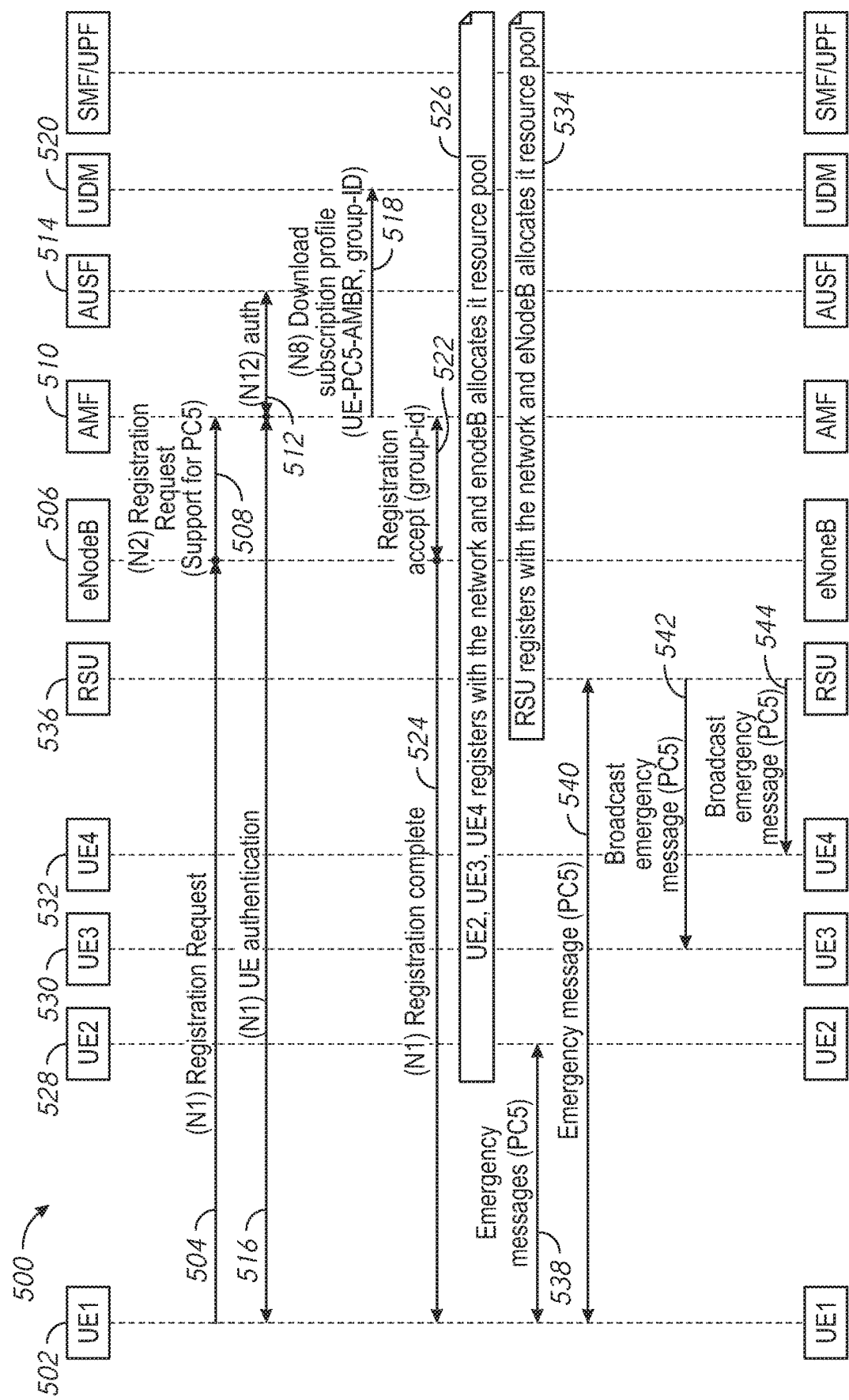
FIG. 5 is a flow diagram that illustrates an example method that may be performed in the network architecture shown in FIG. 4.

FIG. 5 is a flow diagram illustrating an example method 500 that may be performed by a network. In unified data management (UDM), a home subscriber server (HSS) may configure a UE device 502 with a subscription profile. The subscription profile may be configured with a group identifier. The group identifier may identify a category of UE device, e.g., a category of emergency vehicle in which or on which the UE device is installed. For example, a first group identifier may be associated with police patrol vehicles. A second group identifier may be associated with fire brigade vehicles. A third group identifier may be associated with ambulances. Other group identifiers may be associated with other categories of emergency vehicles.

At 504, the UE device 502 may send an eNodeB (eNB) device 506 a registration request, e.g., using the N1 interface. At 508, the eNB device 506 may send the registration request to an AMF module 510 using an N2 interface, for example. The registration request may include a network capability parameter that may indicate whether the UE device 502 supports the PC5 interface.

At 512, the AMF module 510 may communicate with an AUSF module 514, e.g., using the N12 interface to authenticate the UE device 502. The AMF module 510 may communicate the result of the authentication to the UE device 502 at 516, e.g., using the N1 interface. When authentication has completed, the UE device 502 may establish a protocol data unit (PDU) connection.

At 518, the AMF module 510 may use the N8 interface to download a subscription profile from a UDM module 520. The subscription profile may be specific to the UE device 502. The subscription profile may include a QoS parameter, such as a UE-PC5 aggregated maximum bit rate (AMBR) as part of the UE context information. The subscription profile may include a group identifier that may identify a category of UE device, e.g., a category of emergency vehicle in which or on which the UE device 502 is installed. The group identifier may be associated with (e.g., configured for) an identifier that is unique to the UE device 502, such as an international mobile subscriber identity (IMSI).

At 522, the AMF module 510 may communicate a message, e.g., a registration response, to the eNB device 506 indicating that the registration of the UE device 502 was accepted. This message may include the group identifier downloaded from the UDM module 520. The message may include other subscription parameters. At 524, the eNB device 506 may indicate to the UE device 502 that its registration is complete.

At 526, other UE devices 528, 530, 532 may register with the network. The eNB device 506 may receive a respective group identifier for each UE device from the AMF module 510. The UE devices 502, 528, 530, 532 may have the same or different group identifiers.

The eNB device 506 may allocate resources from a dedicated uplink resource pool to the UE devices 502, 528, 530, 532 based on their group identifier or identifiers. Allocating resources from a dedicated uplink resource pool may ensure that resources are always available for use by emergency vehicles. A level of QoS may be ensured.

At 534, a V2I roadside unit (RSU) 536 may register with the network. The eNB device 506 may receive a group identifier for the V2I RSU 536. The group identifier associated with the V2I RSU 536 may be the same as or different from the group identifier or identifiers associated with one or more of the UE devices 502, 528, 530, 532.

When a V2X UE device in an emergency vehicle needs to communicate with other emergency vehicles or with the V2I RSU 536, it may use the allocated resource pools on the PC5 interface. For example, at 538, the UE device 502 may communicate one or more emergency messages with the UE device 528 using allocated resource pools on the PC5 interface. At 540, the UE device 502 may use allocated resource pools on the PC5 interface to communicate one or more emergency messages with the V2I RSU 536.

When the V2I RSU 536 needs to broadcast emergency messages, such as emergency messages that it may receive from UE devices, it may do so using allocated resource pools on the PC5 interface. For example, the V2I RSU 536 may broadcast an emergency message to the UE device 530 using allocated resource pools on the PC5 interface at 542. The V2I RSU 536 may broadcast an emergency message to the UE device 532 using allocated resource pools on the PC5 interface at 544. The RSU may send emergency messages to a V2X application server in a core network using a V1 interface.

Figure 6:
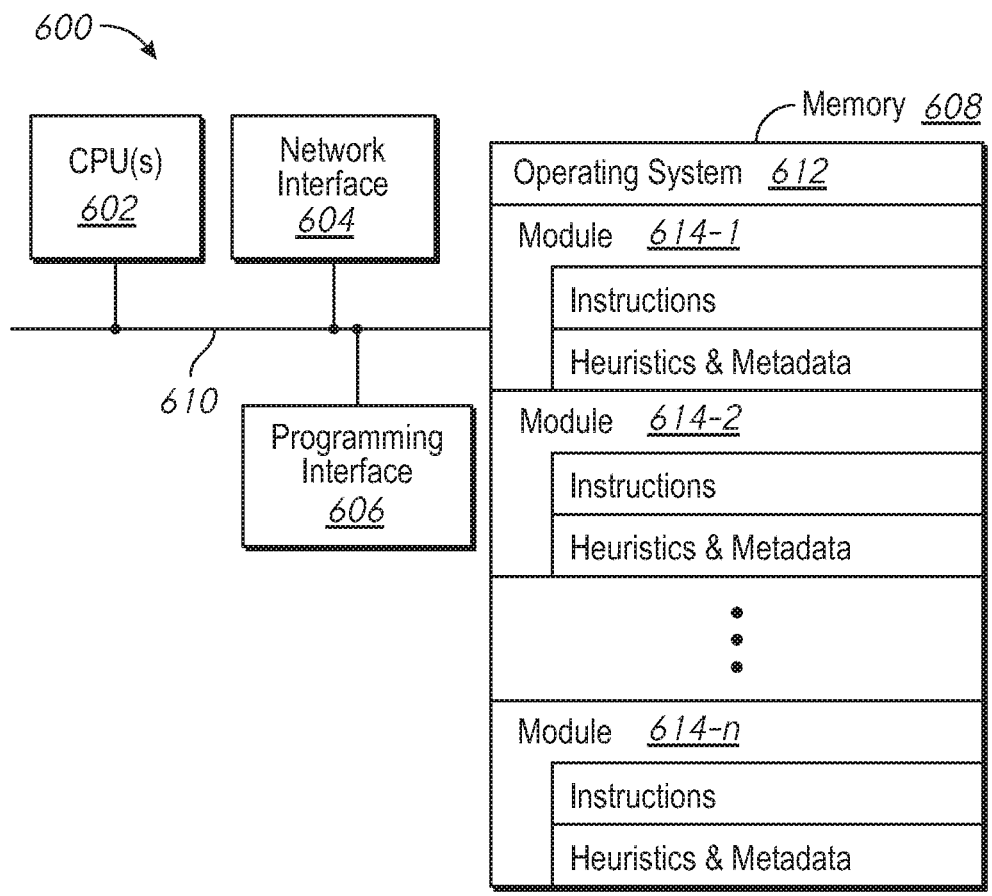
FIG. 6 is a block diagram that illustrates an example server system.

FIG. 6 is a block diagram of an example server system 600 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 600 may include one or more processing units (CPUs) 602, a network interface 604, a programming interface 606, a memory 608, and one or more communication buses 610 for interconnecting these and various other components.

The network interface 604 may be provided to, among other uses, establish and/or maintain a metadata tunnel between a cloud-hosted network management system and at least one private network including one or more compliant devices. In some embodiments, the one or more communication buses 610 may include circuitry that interconnects and controls communications between system components. The memory 608 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 608 may include one or more storage devices remotely located from the one or more CPUs 602. The memory 608 may comprise a non-transitory computer readable storage medium.

In some embodiments, the memory 608 or the non-transitory computer readable storage medium of the memory 608 may include (e.g., store) the following programs, modules, and data structures, or a subset thereof including one or more of an operating system 612 or various modules 614-1, 614-2, . . . , 614-n. The modules 614-1, 614-2, . . . , 614-n, individually and/or collectively, perform one or more of the operations described herein. To that end, in various embodiments, the modules 614-1, 614-2, . . . , 614-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    receiving, from a user equipment (UE) device, a registration request that indicates a category, wherein the category comprises at least one of an emergency vehicle category or a roadside unit (RSU) category;
    receiving a registration response from an access and mobility function (AMF), the registration response comprising a group identifier that indicates the category, wherein the group identifier is based on a subscription profile from a unified data management (UDM) module;
    selecting resources from a resource pool based on the group identifier, the resource pool dedicated for use for emergency communications; and
    allocating the selected resources to the UE device.

2. The method of claim 1, wherein the registration request indicates whether the UE device supports a PC5 interface.

3. The method of claim 1, wherein the selected resources comprise a plurality of resource blocks (Rbs).

4. The method of claim 1, wherein the UE device is associated with an identifier that is unique to the UE device.

5. The method of claim 2, wherein the selected resources are allocated for vehicle to everything (V2X) communication using the PC5 interface.

6. The method of claim 4, wherein the identifier comprises an international mobile subscriber identity (IMSI).

7. A system comprising:
    a network interface in communication with a network;
    a processor configured to execute computer readable instructions included on a non-transitory memory; and a non-transitory memory including processor-readable instructions, that performs an operation when executed by the processor, the operation comprising:

receiving, from a user equipment (UE) device, a registration request that indicates a category, wherein the category comprises at least one of an emergency vehicle category or a roadside unit (RSU) category;

receiving a registration response from an access and mobility function (AMF), the registration response comprising a group identifier that indicates the category, wherein the group identifier is based on a subscription profile from a unified data management (UDM) module;

selecting resources from a resource pool based on the group identifier, the resource pool dedicated for use for emergency communications; and allocating the selected resources to the UE device.

8. The system of claim 7, wherein the registration request indicates whether the UE device supports a PC5 interface.

9. The system of claim 7, wherein the selected resources comprise a plurality of resource blocks (Rbs).

10. The system of claim 7, wherein the UE device is associated with an identifier that is unique to the UE device.

11. The system of claim 7, wherein the system comprises an eNodeB device.

12. The system of claim 10, wherein the identifier comprises an international mobile subscriber identity (IMSI).

13. A system comprising:
a network interface in communication with a network;
a processor configured to execute computer readable instructions included on a non-transitory memory; and
a non-transitory memory including processor-readable instructions, that performs an operation when executed by the processor, the operation comprising:

receiving, from a user equipment (UE) device, a registration request that indicates a category, wherein the category comprises at least one of an emergency vehicle category or a roadside unit (RSU) category;

receiving a subscription profile from a unified data management (UDM) module, the subscription profile comprising a group identifier that indicates the category; and sending the group identifier to an eNodeB device, wherein the group identifier is associated with a resource pool dedicated for use for emergency communications.

14. The system of claim 13, wherein the registration request indicates whether the UE device supports a PC5 interface.

15. The system of claim 13, wherein the subscription profile comprises a quality of service (QoS) parameter.

* * * * *